United States Patent [19]

Arbiter

[11] 4,382,856
[45] May 10, 1983

[54] RECOVERY OF TIN

[75] Inventor: Nathaniel Arbiter, Vail, Ariz.

[73] Assignee: Geological Research Corporation, Houston, Tex.

[21] Appl. No.: 219,980

[22] Filed: Dec. 24, 1980

Related U.S. Application Data

[63] Continuation of Ser. No. 916,517, Jun. 19, 1978, abandoned.

[51] Int. Cl.$^3$ ................................................. B03C 1/00
[52] U.S. Cl. ....................................... 209/10; 209/214; 423/96
[58] Field of Search ...................... 209/8, 39, 214, 213, 209/212, 10; 423/89, 96; 75/1 R

[56] References Cited

U.S. PATENT DOCUMENTS

| | | | |
|---|---|---|---|
| 1,556,449 | 10/1925 | Lockwood | 209/214 X |
| 1,902,937 | 3/1933 | Anden | 209/214 |
| 2,240,718 | 5/1941 | Schiffman | 209/39 X |
| 2,352,324 | 5/1944 | Hubles | 209/214 X |
| 2,815,267 | 12/1951 | Platteuw | 423/96 X |
| 3,289,836 | 12/1966 | Weston | 209/227 X |
| 3,607,216 | 9/1971 | Van Elst | 423/96 X |
| 4,113,466 | 9/1978 | Weston | 209/39 X |
| 4,257,881 | 3/1981 | Kindig | 209/214 X |

OTHER PUBLICATIONS

Chem. Abst., 68, 1968, 5109f.
Chem. Abst., 68, 1968, 80614v.
Chem. Abst., 75, 1971, 100154v.

*Primary Examiner*—Ralph J. Hill
*Attorney, Agent, or Firm*—Sigalos & Levine

[57] ABSTRACT

The process of concentrating tin oxide minerals of fine particle size from material containing the same comprising the steps of forming an aqueous slurry of said material and subjecting said slurry to high intensity wet magnetic separation at a field strength and for a time sufficient to form a concentrate containing a major proportion of the tin oxide minerals originally present in the slurry.

2 Claims, 4 Drawing Figures

RECOVERY OF TIN

This is a continuation of application Ser. No. 916,517, filed June 19, 1978.

BACKGROUND OF THE INVENTION

Tin is found in nature primarily as the oxide in the mineral cassiterite ($SnO_2$). This occurs in crystalline form in many tin ores, but also in fibrous habit as wood tin.

More recently, in Mexico, Australia, and Bolivia, tin oxide has been found to occur in extremely finely disseminated form, identifiable only through x-ray diffraction and by assay, and not visually or by ordinary microscopy. In several of these occurrences of very fine tin oxide, quite substantial tonnages thereof have been blocked out.

The recovery of tin after mining the cassiterite ores conventionally involves the treatment by crushing and grinding to liberate the minerals followed by gravity separation processes to concentrate the mineral in the size range from approximately 10-mesh to 325-mesh (43 microns). Conventionally this may be followed by flotation procedures for size fractions in the range from 325-mesh to approximately 5 to 10 microns in size. Flotation will have been preceded by a desliming operation in hydraulic cyclones to separate all minerals finer than 5 to 10 microns. While the purpose of this desliming is to remove those minerals such as clays and hydrated iron oxides which interfere with cassiterite flotation in the coarser sizes, all cassiterite in the finer sizes is also discarded.

For those ores in which the tin oxide is initially already in extremely fine sizes, gravity separation and flotations are ipso facto inapplicable; for such ores the many efforts to process them have hitherto been unsuccessful.

Thus, the slimes produced by gravity-flotation plants which may represent from ten to thirty percent of the original tin contents of the ores, and those ores containing the tin oxide initially in very fine disseminations, are not presently considered to be tin resources.

SUMMARY OF THE INVENTION

Figure 1:
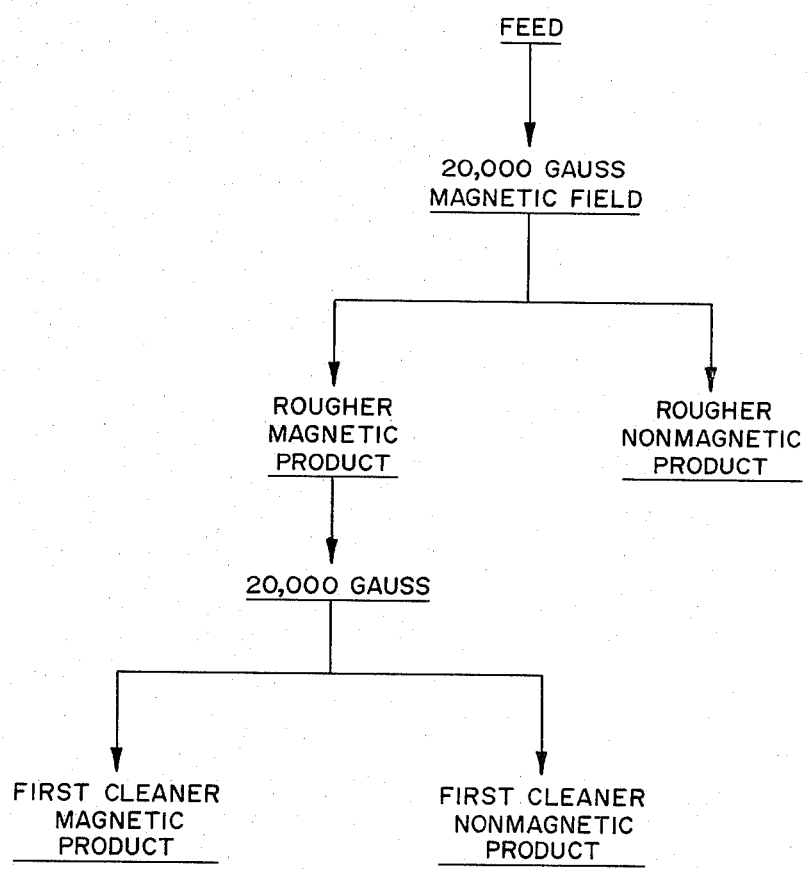
FIG. 1 is a flow sheet of the process according to the present invention.

A process has now been found whereby tin oxide minerals present in ores or slime fractions in sizes finer than 5 to 10 microns can be successfully recovered in a rapid and economical manner.

Briefly stated, the present invention comprises the process of concentrating tin oxide minerals of fine particle size (less than about 10 microns) from material containing the same comprising the steps of forming an aqueous slurry of said material and subjecting said slurry to high intensity wet magnetic separation at a field strength and for a time sufficient to form a concentrate containing a major proportion of the tin oxide minerals originally present in the slurry. The invention also comprises the further beneficiation of such concentrate by hydrometallurgical methods or more preferably by volatilization of the concentrate.

DETAILED DESCRIPTION

While the instant process is suitable for the recovery of tin oxide from mined ores and the very fine or slime fractions of ores presently being treated by gravity and/or flotation separation techniques, it will be discussed in connection with the recovery from mined cassiterite ore.

As previously discussed above, the technique for recovery of tin oxide mineral in the size range above approximately 10 microns is well-known, and consequently will not be discussed herein since it forms no part of the present invention. Rather, the discussion will be limited to recovery of tin oxide minerals in the size range finer than about 10 microns which are currently mostly discarded.

The initial step in the instant process for recovery of such fines is to form an aqueous slurry of the fines if they are already not in that form. In some operations, such as froth flotation, the fraction containing the fines which is currently discarded is in the form of an aqueous pulp. The concentration of solids in the pulp is not critical so long as it is convenient to handle in the apparatus used to effect magnetic separation as hereinafter described. Most suitably, it has been found that it is best to use a slurry having about 15% to 25% solids therein.

The slurry is then passed through a magnetic separator, preferably, a high intensity wet magnetic separator. Any conventional magnetic separator currently available can be used so long as it is one which can generate a field strength of up to 20 kilogauss (20,000 gauss). It has been found that for most suitable operations, a field strength of 10,000 to 20,000 gauss should be used in carrying out such process.

The slurry is fed into the magnetic separator while the field strength is being generated. The residence time in the separator is not critical. Ordinarily, the slurry can be fed into the separator as rapidly as it can pass therethrough. Also the higher the solids concentration of the slurry the slower the throughput time. After the slurry has been passed therethrough, the magnetic fraction is retained and the non-magnetic fraction can be discarded or preferably it can be subjected to a further magnetic separation to ensure removal of the maximum amount of tin oxide. In most high intensity wet magnetic separators there is a matrix usually made of steel, such as stacked steel plates or steel wool, which traps the small particles of tin oxide. The matrix is preferably washed with excess water to remove any non-magnetic material. Thereafter, the matrix is demagnetized and the tin oxide material recovered separately by washing with water. If the particle size of both the fines and the matrix are properly matched, the non-magnetic particles in the slurry usually pass through the structure of the matrix. It is not essential, however, that this size relationship between the particles of minerals and matrix be matched.

While only one pass through the separator gives good recoveries, it is preferred to use multiple passes, particularly of the non-magnetic products to ensure maximum recovery of the tin. Such multiple passes are depicted in FIGS. 1 to 4 and described in detail in the Examples that follow. It has been found that with the process of the instant invention the ratio of concentration of tin can be approximately 3 to 3.5 with all but the very lowest grade ores.

After the bulk of the tin has been recovered, it has been found that up to 85% of the tin in the slurry of fines has been recovered, but one is still left with a low grade tin concentrate of about 3 to 15% tin. Presently, concentrates assaying below 20% tin are often not commercially suitable for smelting.

The further beneficiation of such concentrates can be accomplished by hydrometallurgical methods. Use of sulfuric or hydrochloric acid to leach the soluble contaminates such as iron oxides or carbonates from the concentrate gives a significant increase of about 10% in concentration. Such leaching is not entirely suitable since the concentrate still does not contain a sufficient percentage of tin and since the expense of treatment of the acid and disposal of acidic waste solutions may be difficult.

A more preferred method of treating the low grade concentrates is to volatilize the tin by any of the known volatilization procedures. This is accomplished by mixing the concentrate containing 3 to 5%, or higher amounts, of tin with a carbonaceous fuel and a source of sulphur such as a pyrite. Alternatively, the concentrate can be mixed with the carbonaceous fuel and a chloride such as sodium or calcium chloride. The resultant mixture, whether with pyrite or chloride, is then heated to a temperature of about 800° to 1000° C. Under such conditions, the tin oxide in the stannic form is simultaneously reduced to the stannous form and volatilized as stannous sulfide or stannous chloride and thereby separated from the bulk of the original concentrate. The thus volatilized stannous sulfide or stannous chloride on contact with air reoxidizes to form stannic oxide fume which is collected as a high grade product assaying typically 40% to 60% tin. Such product may then be smelted or sold to smelters, unlike concentrates assaying below 20% tin which are usually not saleable.

In ores containing significant amounts of strongly magnetic minerals, such as magnetite or pyrrhotite, the slurry should be first passed through the separator at weak magnetic fields, about 500 to 1000 gauss, to remove such minerals before applying the higher intensity fields required to recover the tin oxide.

The invention will be further described in connection with the following examples wherein proportions are by weight, unless expressly stated to the contrary.

A composite ore was formed by first taking six cassiterite ore samples from various locations in the same mining area, stage crushing each of the samples to ¼-inch, combining the six samples, and then stage crushing the composite to minus 10-mesh and blending. Chemical analyses of each of the samples and of the composite were made for tin and an analysis of the composite also for total iron. The composite sample was also subjected to a qualitative, semi-quantitative emission spectographic analysis to determine the existence of other elements in significant amounts. The results are set forth below.

| | A. Chemical Analysis: | |
|---|---|---|
| Sample No. | Assay, % Sn | Assay, % Fe |
| Sample 1 | 2.01 | — |
| Sample 2 | 1.19 | — |
| Sample 3 | 1.61 | — |
| Sample 4 | 2.07 | — |
| Sample 5 | 1.56 | — |
| Sample 6 | 1.18 | — |
| Composite (direct) | 1.63 | 1.40 |
| Composite (average calculated from all tests) | 1.68 | — |

| B. Spectographic Analysis: | |
|---|---|
| Element | Approximate % |
| Silicon | Major (above 10%) |
| Aluminum | 10 |
| Calcium | 1 |
| Lead | 0.5 |
| Zinc | 0.5 |
| Arsenic | 0.1 |
| Titanium | 0.1 |
| Magnesium | 0.01 |
| Strontium | 0.005 |
| Manganese | 0.002 |

EXAMPLE 1

A feed was prepared by mixing a portion of the composite, which had been ball mill ground in a laboratory steel ball mill to approximately 90% minimum 400-mesh, with water to form a slurry having a 20% solids pulp density.

This slurry was then subjected to high gradient magnetic separation using a pilot plant model of the Sala High Gradient Magnetic Separator in the process depicted in FIG. 1.

First, the slurry was passed through the magnetized matrix of the separator while it was operated at 20,000 gauss and the magnetized matrix washed with excess water to ensure removal of the non-magnetic material. The matrix was then demagnetized and the magnetic material recovered by washing with water.

The initial, or rougher, magnetic product was cleaned by passing it again through the separator at 20,000 gauss to give a first cleaner magnetic product and additional non-magnetic product.

The results of this test are set forth in Table I below.

TABLE I

| Product | Wgt. % | Assay, % Sn | % Distribution, Sn |
|---|---|---|---|
| 20K Gauss Cleaner Magnetic | 18.2 | 4.84 | 51.4 |
| 20K Gauss Cleaner Non-magnetic | 9.7 | 1.44 | 8.2 |
| 20K Gauss Rougher Non-magnetic | 72.1 | 0.96 | 40.4 |
| Head (Calc.) | 100.0 | 1.71 | 100.0 |

EXAMPLE 2

Figure 2:
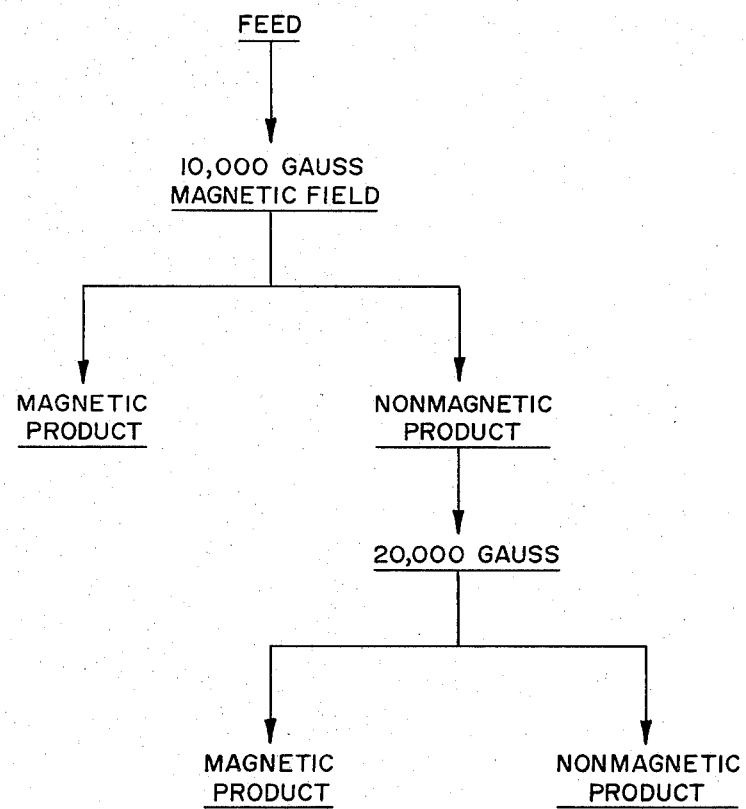
FIG. 2 is a flow sheet of an alternate embodiment of the process of the present invention.

The procedure of Example 1 was followed except that the slurry was first subjected to a rougher magnetic separation at 10,000 gauss and the non-magnetic product passed through the separator at 20,000 gauss; all as depicted in FIG. 2 of the drawings.

The results of this test are set forth in Table II below.

TABLE II

| Product | Wgt. % | Assay, % Sn | % Distribution, Sn |
|---|---|---|---|
| 10K Gauss Magnetic | 20.9 | 4.14 | 53.3 |
| 20K Gauss Magnetic | 13.9 | 2.08 | 17.8 |
| 20K Gauss Non-magnetic | 65.2 | 0.72 | 28.9 |
| Head (Calc.) | 100.0 | 1.62 | 100.0 |

While the tests of Examples 1 and 2 both show that a low grade tin concentrate was recovered by the process of the instant process, the test of Example 2 showed a combined magnetic product recovered which assayed 3.32% Sn and represented a recovery of tin of 71.1% with approximately 65% of the weight of the ore rejected.

EXAMPLE 3

Figure 3:
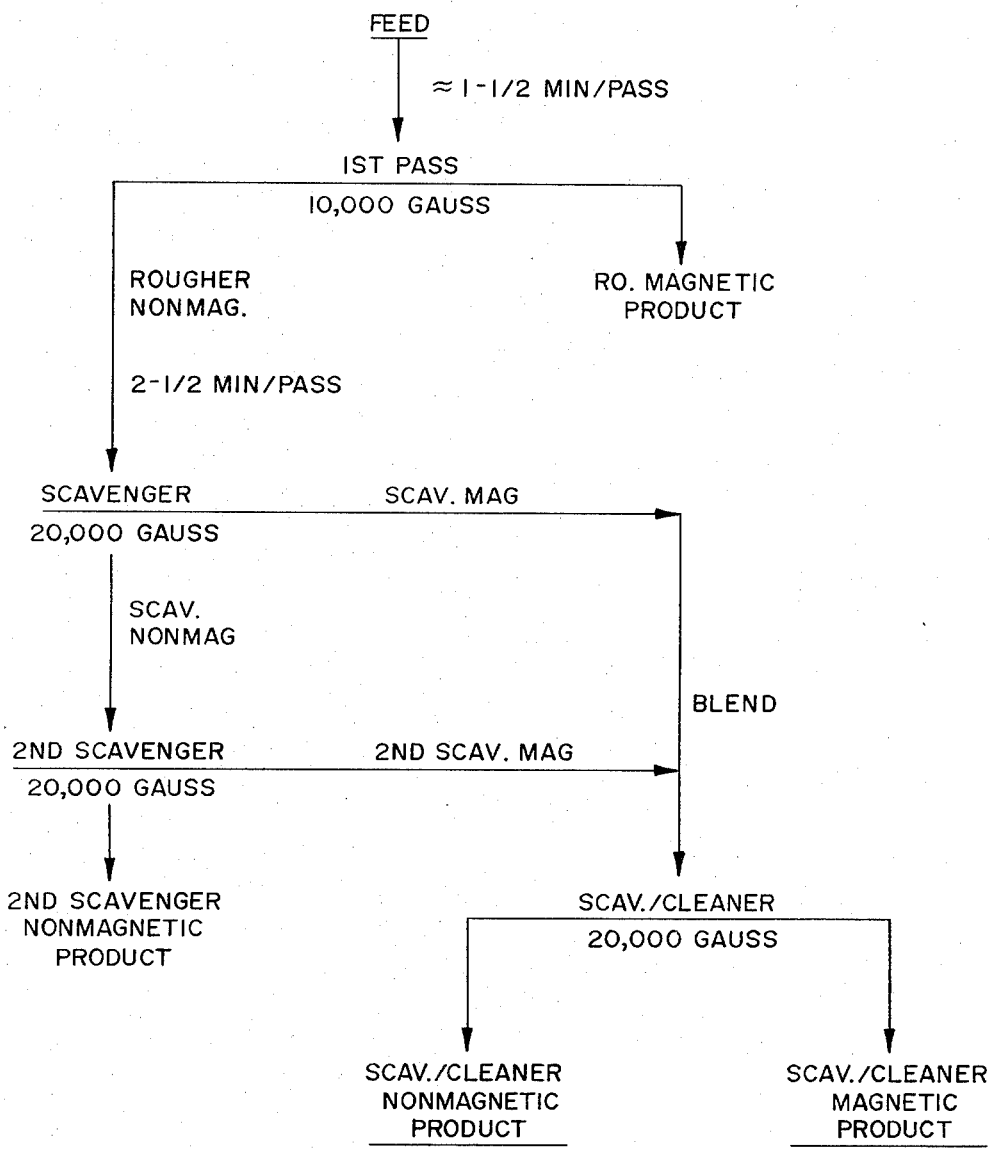
FIG. 3 is a flow sheet of a further alternate embodiment of the process of the present invention.

In this test, the process depicted in FIG. 3 was carried out using the conditions of Example 2 except that the non-magnetic product was repassed through the separator twice at 20,000 gauss and two scavenger magnetic products were recovered, combined, and passed through the separator for a cleaner stage at 20,000 gauss.

The test results are summarized in Table III below.

TABLE III

| Product | Wgt. % | Assay, % Sn | % Distribution, Sn |
|---|---|---|---|
| Rougher Magnetic | 35.7 | 3.14 | 67.7 |
| Scav/Cleaner Magnetic | 6.0 | 2.74 | 10.0 |
| Scav/Cleaner Non-magnetic | 29.2 | 0.74 | 13.1 |
| 2nd Scavenger Non-magnetic | 29.1 | 0.52 | 9.2 |
| Head (Calc.) | 100.0 | 1.65 | 100.0 |

The assay of the combined magnetic products was approximately 3% which represented a ratio of concentration of tin of 1.8 and an overall recovery of tin of approximately 78%.

Further recovery of tin from the non-magnetic products by gravity concentration was unsuccessful and believed due possibly to the extremely fine particle size and suspected low specific gravity of the tin mineralization.

In order to further upgrade the rougher magnetic and scavenger/cleaner magnetic product, a sample thereof was subjected to digestion in boiling, concentrated hydrochloric acid. This digestion resulted in upgrading the tin assay of the products by approximately 10% each.

EXAMPLE 4

A test was performed on each of six additional samples of tin ore. Each sample was crushed through ¼-inch, blended, and a head and one test charge removed for analysis and test. There was some fluorite and considerable talc observed in most samples with the head analysis showing:

| Sample | Head Assay, % Sn |
|---|---|
| 1 | 1.04 |
| 2 | 1.82 |
| 3 | 1.52 |
| 4 | 1.06 |
| 5 | 1.88 |
| 6 | 0.16 |

In the test on each sample, each sample was first ground to approximately 90% minus 400-mesh in a laboratory steel ball mill and mixed with water to form a slurry having a 20% solids pulp density.

Figure 4:
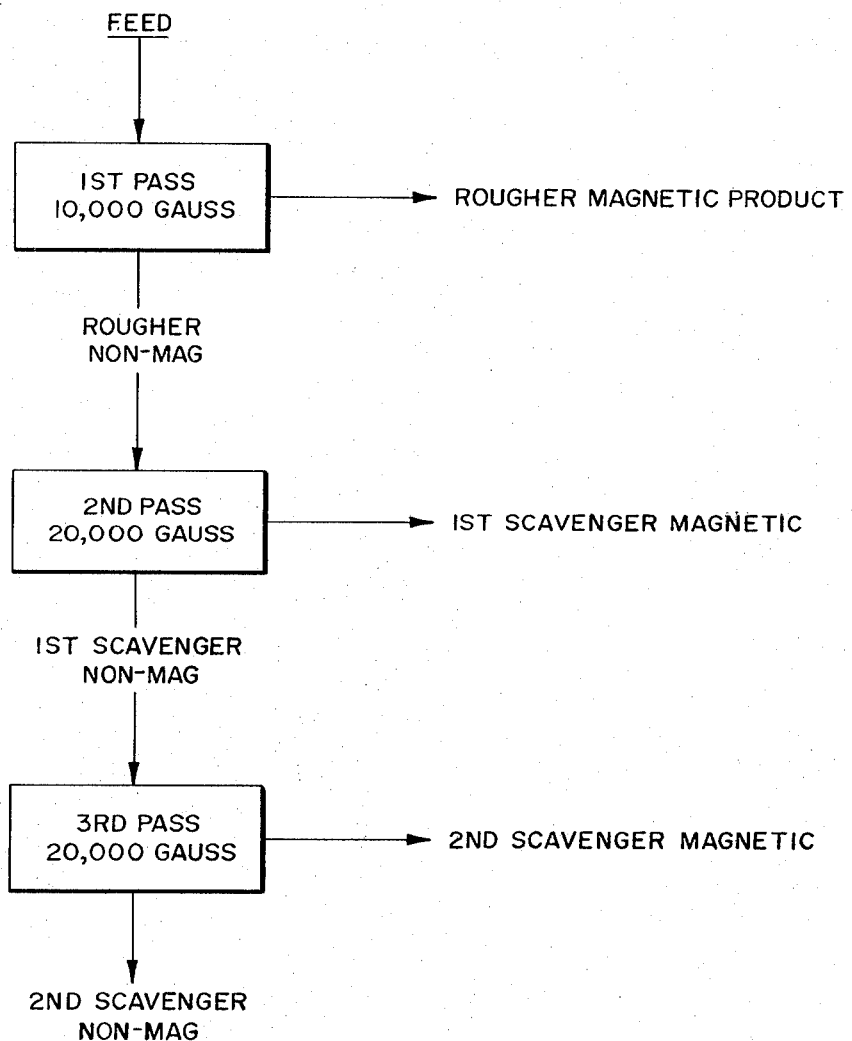
FIG. 4 is a flow sheet of another alternate embodiment of the process of the present invention.

In each magnetic separation test, as depicted in FIG. 4, the same separation apparatus and conditions were used as described in Example 2, except that the first pass non-magnetic product was then repassed through the separator twice at 20,000 gauss and first and second scavenger magnetic products recovered.

The results of the tests on the six samples are set forth in Table IV below.

TABLE IV

| Sample No. | Product | Weight % | Assay, % Sn | % Distribution, Sn |
|---|---|---|---|---|
| 1 | Rougher Mag | 9.0 | 4.34 | 31.8 |
|  | 1st Scav Mag | 5.0 | } 2.25 | 15.9 |
|  | 2nd Scav Mag | 3.7 |  |  |
|  | Non-mag | 82.3 | 0.78 | 52.3 |
|  | Head (Calc.) | 100.0 | 1.23 | 100.0 |
|  | Head (Direct) |  | 1.04 |  |
| 2 | Rougher Mag | 26.0 | 5.17 | 77.4 |
|  | 1st Scav Mag | 8.4 | } 1.60 | 13.0 |
|  | 2nd Scav Mag | 5.7 |  |  |
|  | Non-mag | 59.9 | 0.28 | 9.6 |
|  | Head (Calc.) | 100.0 | 1.74 | 100.0 |
|  | Head (Direct) |  | 1.82 |  |
| 3 | Rougher Mag | 20.6 | 4.89 | 67.2 |
|  | 1st Scav Mag | 10.3 | } 1.31 | 15.6 |
|  | 2nd Scav Mag | 7.5 |  |  |
|  | Non-mag | 61.6 | 0.42 | 17.2 |
|  | Head (Calc.) | 100.0 | 1.50 | 100.0 |
|  | Head (Direct) |  | 1.52 |  |
| 4 | Rougher Mag | 20.5 | 3.65 | 71.9 |
|  | 1st Scav Mag | 8.9 | } 0.77 | 11.5 |
|  | 2nd Scav Mag | 6.6 |  |  |
|  | Non-mag | 64.0 | 0.27 | 16.6 |
|  | Head (Calc.) | 100.0 | 1.05 | 100.0 |
| 5 | Rougher Mag | 20.7 | 5.28 | 62.9 |
|  | 1st Scav Mag | 10.0 | } 1.98 | 19.1 |
|  | 2nd Scav Mag | 6.8 |  |  |
|  | Non-mag | 62.5 | 0.50 | 18.0 |
|  | Head (Calc.) | 100.0 | 1.74 | 100.0 |
|  | Head (Direct) |  | 1.88 |  |
| 6 | Rougher Mag | 11.1 | 0.62 | 47.5 |
|  | 1st Scav Mag | 6.5 | } 0.24 | 20.9 |
|  | 2nd Scav Mag | 6.1 |  |  |
|  | Non-mag | 76.3 | 0.06 | 31.6 |
|  | Head (Calc.) | 100.0 | 0.14 | 100.0 |
|  | Head (Direct) |  | 0.16 |  |

The results of these tests showed that, in general, the six ore samples were amenable to concentration by high intensity magnetic separation.

The response of Samples 2, 3 and 5 to magnetic separation appeared to be similar to the response of the original, composited samples of Example 1. The average grade of these three samples was 1.66% Sn which was substantially identical to the composited sample.

The average results of the magnetic separation on Samples 2, 3 and 5 showed that a rougher magnetic product was recovered which assayed approximately 5% Sn and represented recoveries of tin ranging from 62.9 to 82.0%. Further scavenging by magnetic separation recovered an additional 13 to 20% of the tin at a grade of approximately 1.3 to 2.0% Sn.

The results of the magnetic separation on a lower head grade Sample 4 showed that a rougher magnetic product was recovered which assayed 3.65% Sn at a recovery of tin of 72%. This product would require further upgrading.

The results of the tests on Samples 1 and 6 showed that these samples were somewhat less responsive to magnetic separation than the other samples. In the test performed on Sample 1, a combined rougher-scavenger magnetic product was recovered which assayed 3.3% Sn at a recovery of tin of only 47.7%. In the test performed on the lowest grade, Sample 6, 68.4% of the tin was recovered, but the combined magnetic product assayed only 0.42% Sn. This product would also require further upgrading to be suitable for smelting.

EXAMPLE 5

The resultant tin concentrates of each of the foregoing examples is beneficiated by a standard volatilization procedure.

Each concentrate is mixed with sufficient carbonaceous fuel and a pyrite and heated to a temperature between about 800° to 1000° C. for a time sufficient to reduce the tin to the stannous form and volatilize it as stannous sulfide which separates it from the bulk of the concentrate. The volatilized stannous sulfide is brought into contact with an oxygen-containing gas, such as air, and reoxidized to form stannic oxide fume which is collected. It is found that the resultant product is a high grade concentrate assaying, typically, about 40% to 60% Sn.

While the invention has been described in connection with a preferred embodiment, it is not intended to limit the scope of the invention to the particular form set forth, but, on the contrary it is intended to cover such alternatives, modifications, and equivalents as may be included within the spirit and scope of the invention as defined by the appended claims.

What is claimed is:
1. The process of concentrating tin oxide minerals having a particle size less than about 10 microns from ore containing the same comprising the steps of forming an aqueous slurry of said ore containing about 15% to 25% total solids, subjecting said slurry to high intensity wet magnetic separation at a field strength of about 10,000 gauss to separate the slurry into a rougher non-magnetic product and a rougher magnetic product, subjecting said rougher non-magnetic product to two further separations at a field strength of about 20,000 gauss to form scavenger non-magnetic products and scavenger magnetic products, combining the scavenger magnetic products, subjecting said combined scavenger magnetic products to separation at a field strength of about 20,000 gauss to form scavenger/cleaner magnetic product and scavenger/cleaner non-magnetic product, and combining said rougher magnetic and scavenger/cleaner products magnetic products to form a concentrate containing the major proportion of the tin oxide minerals originally present in the slurry.

2. The process of claim 1 including the step of beneficiating the concentrate by volatilization.

* * * * *